R. ARNO.
SYSTEM FOR GENERATING HIGH FREQUENCY CURRENTS.
APPLICATION FILED JAN. 26, 1914.
1,240,294.
Patented Sept. 18, 1917.
2 SHEETS—SHEET 1.
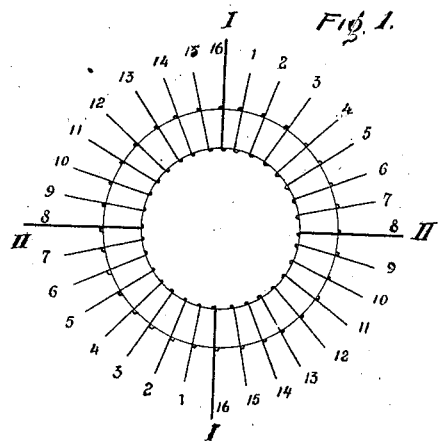
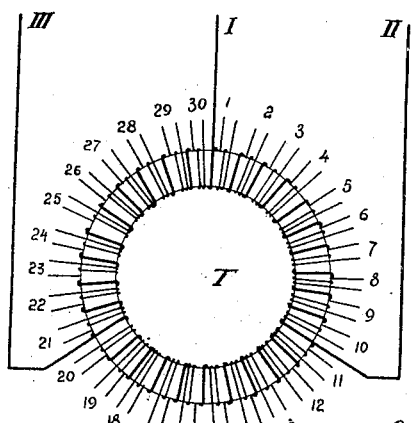
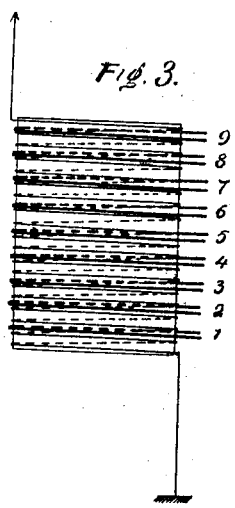
Inventor
Riccardo Arno
By [signature]
Attorney.

Riccardo Arnò, INVENTOR

UNITED STATES PATENT OFFICE.

RICCARDO ARNÒ, OF MILAN, ITALY.

SYSTEM FOR GENERATING HIGH-FREQUENCY CURRENTS.

1,240,294.
Specification of Letters Patent.
Patented Sept. 18, 1917.

Application filed January 26, 1914. Serial No. 814,374.

*To all whom it may concern:*

Be it known that I, RICCARDO ARNÒ, professor, subject of the King of Italy, resident of Milan, in the Kingdom of Italy, No. 3 Via Quintino Sella, have invented new and useful Improvements of Systems for Generating High-Frequency Currents, of which the following is a specification.

The present invention relates to a system for generating high frequency currents.

The principle upon which the invention is based is as follows:—

I construct a transformer of suitable proportions, fed in the primary circuit by an alternating current with N phases, that is to say, by N alternating currents, with phases suitably displaced with relation to one another, wherein N may be any whole number compatible with the construction of the machine for generating this system of N-currents.

The system of primary N phases feeds, as in an ordinary transformer, a secondary constructed so as to allow not only of raising the secondary tension with relation to the primary in the ratio of transformation of the transformer, but also of drawing from each of the N feeding phases a number K of phases. There is thus a total NK of secondary phases, and if it is desired to further increase the product NK by means of a second similar transformation, a number of phases being a multiple of NK can be had, according to the ratio of transformation of phases between the first and second transformation.

This being so, if —$n$— represents the frequency of the phase displaced currents generated by the polyphase machine feeding the primary of the transformer in question, the number of the electro-magnetic impulses or the total number of the maximums of the polyphase electro-magnetic oscillation drawn from the whole of the secondary NK phase, will obviously be $2n$NK per second.

Now, since it is obvious that NK can be as large as desired, consistent with the practical construction of the phase transformer, and similarly, —$n$— can be made as large as desired consistent with the construction of the polyphase generator, therefore, $2n$NK can be relatively very great and in any case, consequently, much larger than the number of periods per second, of the simple alternating current produced by any special high frequency alternator.

It is easy to see how $2n$NK can also attain such values that they may rank with the number of electro-magnet impulses per second necessary for wireless telegraphy and telephony.

I would observe that the phase transformer, as it is a static apparatus and consequently has no turning member and no friction contact, can easily be so constructed as to present a high degree of insulation, and eventually be immersed in oil or any equivalent dielectric liquid and resist the highest tensions which particularly in the field of wireless telegraphy and telephony, may be required from it.

This principle is known, and the invention consists in its application to the production of high frequency currents particularly to wireless telegraphy and telephony.

In the accompanying drawing which diagrammatically illustrates the invention—

Figure 1 is a biphase transformer, and

Fig. 2 is a triphase transformer.

Fig. 3 is a Tesla transformer or jigger, and

Figure 4:
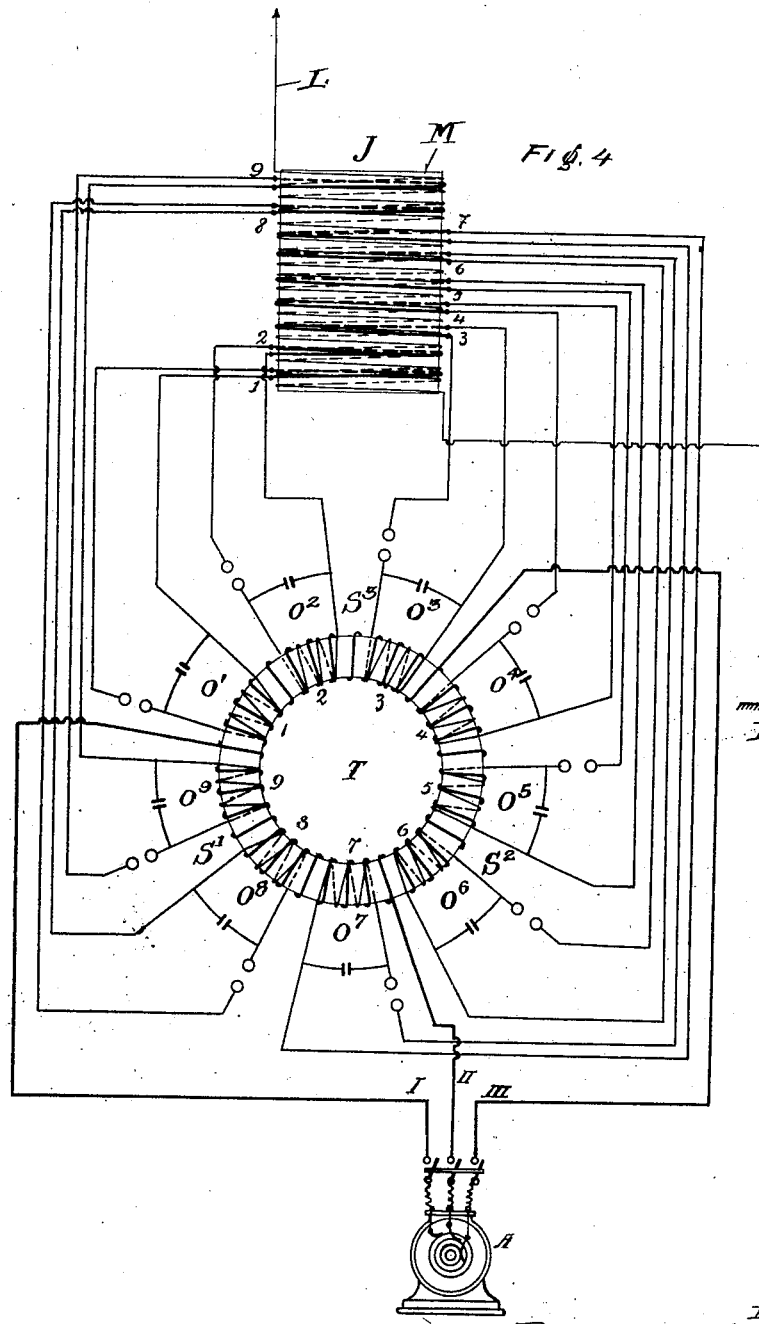
Fig. 4 is a general diagrammatic view of a triphase feeding system with nine secondary phases.

This system consists in the combination of a polyphase machine, a static phase transformer, designed to considerably increase the number of the phases (and eventually to raise the tension corresponding to the various phases, and to pass from the primary system of phases to the secondary system of disconnected phases), and a series of spark oscillators respectively actuated by the said phases, with the corresponding oscillating circuits actuating a single aerial wire by means of a special jigger only.

Accordingly each oscillating circuit is indirectly connected to a single winding in communication with the aerial wire which receives by induction the whole of the electro-magnetic effects produced by the electro-magnetic phase displaced impulses due to the trains of oscillations produced by the oscillating circuits, so that a special jigger is provided which may be regarded as a polyphase jigger composed of a number of primary windings separated one from another and each forming part of one of the oscillating circuits and of a single secondary in communication with the aerial conductor.

In wireless telephony it is well known that the transmission depends upon variations produced by the microphone in a high frequency current. In order to have a good telephonic transmission this current must produce no sound when the microphone is not working. Such condition in practice is only approximately fulfilled when the current is produced by a Poulsen or shunt arc, in which case this current is far from being constant and regular as the arc roars, hums, and buzzes, and these noises are heard perfectly at the receiving station where they dominate the voice which is consequently distorted and often incomprehensible.

My invention, among other purposes, has for object an arrangement of generator for producing a current for wireless telephony which is absolutely insensible to the human ear.

The principle upon which this portion of the invention is based, is that of producing a number of wave-trains uniformly distributed over periods of time, absolutely equal as regards intensity and damping, of a number such that the sound produced is superior to the hearing limit of the human ear. This limit as is known is about 30,000 per second. It is consequently necessary to produce at least 30,000 discharges per second to attain this object.

This is easily attained by having recourse to the employment of a static phase transformer as hereinbefore described.

The principle of this transformer is indicated by the diagrammatic Fig. 1.

A torus of magnetic material carries a continuous winding. At equidistant points it is fed by a polyphase current. In the figure the feeding current is biphase. The phase of the difference of potential between two diametrically opposed convolutions, varies with the angles formed by this diameter with the diameters I, I and II, II. In the case of the figure, for example, the phase of the difference of potential between the points 4, 4 differs by one-eighth of a period from the feeding phases of the difference of potential I, I and II, II. By taking a sufficient number of points on the winding a number of phases is obtained as large as may be desired. In the figure, for example, I have passed from a biphase system to a 16-phase system.

Suppose —n— to be the frequency of the polyphase current and N, K the total number of phases drawn from the phase transformer; the total number of sparks which can be obtained will obviously be $2n$NK.

It is actually possible to construct machines of 1,000 frequency. Consequently, in order to obtain a number of sparks equal to 32,000 per second, it is only necessary that the phase transformer shall furnish 16 phases, and in cases where it is desired to employ a current of the frequency ordinarily in use in industries, for example, then a number of 32,000 sparks per second could be obtained, on condition that the number of the phases furnished by the phase transformer is equal to 320.

In practice the phase transformer is formed with several bobbins, convolutions, or windings, regularly distributed over the whole circumference. The number of these bobbins is a multiple of 4 or 3 according as the current of the polyphase system of feeding is biphase or triphase. In the first case the bobbins are in pairs diametrically opposed, and the number of phases is consequently equal to half the number of the bobbins.

In order that the secondary differences of potential may have a given value, and supposing the E. M. F. of the alternator is not sufficient to attain this object, two courses may be followed.

The first consists in raising the difference of potential of the feeding phases by means of a transformer before sending it into the phase transformer.

The second consists in constructing the phase transformer with two coils, one for the feeding phases, and the other for the secondary phases. In this case, the phase transformer also operates as a transformer of potential and can serve also for passing from a system of connected phases to a system of disconnected phases (see for example, the triphase primary arrangement, I, II, III and 30-phase secondary in Fig. 2).

Referring to the case in which the phase transformer consists of two coils distinct from one another, it is to be observed that the number of the phases of the secondary system may be odd or even, and it will be readily seen how, as it is a question of systems of generation of electro-magnetic oscillations like those which are hereinafter mentioned and described that it is evidently more advantageous generally to adopt an odd number of phases of the secondary system. In fact, it is clear that in the case of an even number of phases, there would be the inconvenience of having the said phases in pairs corresponding to an angular value of 180°, the result of which would be a less advantageous use of the apparatus.

To utilize a large number of phases a single aerial wire can be employed as represented in the Tesla transformer or jigger, Fig. 3, which is an actual polyphase jigger.

The complete arrangement is that which is represented in Fig. 4 wherein a triphase alternator A, of 1,000 frequency for example, is employed, which by means of three connected phases I, II and III, directly feeds the triphase primary of the phase transformer. The 9-phase secondary furnishes the 9-single phase and disconnected high tension currents to the 9 corresponding oscillating circuits connected to a single jigger I, as represented separately in Fig. 3.

It is important to remark that the new system of generating electro-magnetic oscillations, or new Hertzian oscillator, consists of a suitable practical combination of numerous generators or oscillators, which are all respectively fed by means of the phase transformer.

The result is that for the application of this system all the generators or oscillators heretofore employed in practice can be advantageously used as well as all those which may be devised in the future, whether they are based upon the principle of the Hertz oscillator (generator of damped electromagnetic oscillations), or on the principle of the Poulsen arc (generator of permanent electro-magnetic oscillations), or whether they are of a type derived from these latter, or of a special type like those of Marconi, Telefunken, Wien, Lepel, Jacoviello, Moretti, Galetti, etc.

What I claim as my invention is:

1. The combination of a current generator, and a static transformer connected thereto, a plurality of secondary circuits connected to the transformer, and an aerial conductor with which each secondary circuit has independent communication for energizing the same.

2. The combination of a current generator of a low number of phases and low tension, and a static transformer connected thereto for transforming the phases into a current of multiple phases of high frequency, and an antenna with which the multi-phases are united as an induction.

3. The combination of a current generator of a low number of phases and low tension, and a static transformer connected thereto for transforming the phases into a current of multiple secondary phases of high frequency, a jigger consisting of a plurality of primary circuits and a secondary circuit, said primary circuits being associated with the secondary phases of the transformer, and an aerial conductor in communication with said last mentioned secondary circuit of the jigger.

4. The combination of a plurality of circuits including a static transformer, means for charging the circuits, and an aerial conductor and jigger in associated relation, said circuits being in independent communication with the jigger for actuating the aerial conductor.

In testimony whereof I hereunto affix my signature in the presence of two witnesses.

RICCARDO ARNÒ.

Witnesses:
 B. CARLO SALVOTTI,
 LYLE ROBB.